United States Patent [19]

Brown

[11] Patent Number: 4,591,987
[45] Date of Patent: May 27, 1986

[54] VIDEO RANGEFINDER
[75] Inventor: David C. Brown, Enfield, Conn.
[73] Assignee: Kollmorgen Technologies Corp., Dallas, Tex.
[21] Appl. No.: 517,807
[22] Filed: Jul. 27, 1983
[51] Int. Cl.[4] .............................................. G06G 7/78
[52] U.S. Cl. .................................... 364/458; 364/561; 358/107
[58] Field of Search ............... 364/423, 458, 560, 561; 358/107; 356/1, 4

[56] References Cited
U.S. PATENT DOCUMENTS

| | | | |
|---|---|---|---|
| 2,786,096 | 3/1957 | Palmer | 358/107 |
| 3,443,870 | 5/1969 | Morgan et al. | 358/107 |
| 3,604,003 | 9/1971 | Freier et al. | 364/458 |
| 3,783,189 | 1/1974 | Nelson | 358/107 |
| 4,004,960 | 3/1977 | Feldman et al. | 356/1 |
| 4,295,201 | 10/1981 | Wiklund | 364/561 |

Primary Examiner—Parshotam S. Lall
Attorney, Agent, or Firm—Morgan, Finnegan, Pine, Foley & Lee

[57] ABSTRACT

A system for determining range and orientation of distant objects such as a ship. By utilizing split imaging the observed height on a video monitor can be accurately determined despite movements of the image on the monitor. The observed ship can be visually identified and the true height determined from reference sources. A better comparison of data indicating the true height compared to observed height permits calculation of the range to the target ship. Split imaging can also be utilized to determine the observed length of the ship so that observed height and length data can be compared to the true height and length of the target ship to determine orientation of the target ship relative to the observer.

16 Claims, 8 Drawing Figures

VIDEO RANGEFINDER

This invention relates to rangefinding apparatus and, more particularly, to video rangefinders.

BACKGROUND OF THE INVENTION

Optical rangefinding is generally accomplished by utilizing optical split imaging techniques. The target is viewed from two different locations and the images are superimposed. In such systems the angle of reflection required to achieve optical coincidence of the images is a function of range. Thus, if the operator adjusts the angle to achieve coincidence the adjustment can be calibrated to indicate range.

One disadvantage of such optical rangefinders is that the range accuracy is a function of mechanical and optical tolerances. Such systems become very costly if designed to measure range accurately, particularly at relatively large distances as is typical in shipboard applications. Another disadvantage is that optical rangefinders are difficult to incorporate in submarine periscopes because of the distance and optical couplings necessary between the viewing locations (above the water surface) and the superimposed images (inside the submarine).

An object of this invention is to provide a video rangefinding system capable of detecting range from a single view of the target, using a standard TV video input.

Another object of the invention is to provide a split image video rangefinder wherein the split images are created electronically rather than optically.

Still another object is to provide a video rangefinding system which is generally insensitive to the relative movement between the target and the viewing position such as is common in shipboard applications.

BRIEF DESCRIPTION OF THE INVENTION

In a preferred embodiment according to the invention a target is viewed using a video camera which can be a conventional television camera or one sensitive to infrared radiation. In creating a display the two fields of a standard television raster scan are offset relative to one another resulting in a split image on the screen. When used to determine the range of a target ship, the raster offset between the two fields is adjusted to place the top of the mast of the lower image on the water line of the upper image. The ship is then visually identified by the operator who then inputs data indicatin9 the aotual height of the target ship such as can be determined from Jane's Book of Ships or other similar reference materials. By comparing the raster offset or split angle (proportional to target height as viewed) with the known actual height of the target ship, range can be determined since:

$$\text{Range} = \frac{\text{target height}}{\text{Tan } \theta \text{ (split angle)}}$$

Since both of the split video images are derived from the same video signal there is no relative movement between the split images on the screen. Vertical movement of the target, such as is usual in shipboard applications, causes both of the images to move together and, hence, does not affect ranging. Since the split image is achieved electrically most of the expensive mechanical and optical apparatus of prior optical ranging systems are eliminated.

BRIEF DESCRIPTION OF THE DRAWINGS

The foregoing and other objects of the invention will become apparent from the following detailed specification which sets forth several illustrative embodiments of the invention. The drawings form part of this specification wherein.

DETAILED DESCRIPTION OF THE DRAWINGS

Figure 1:
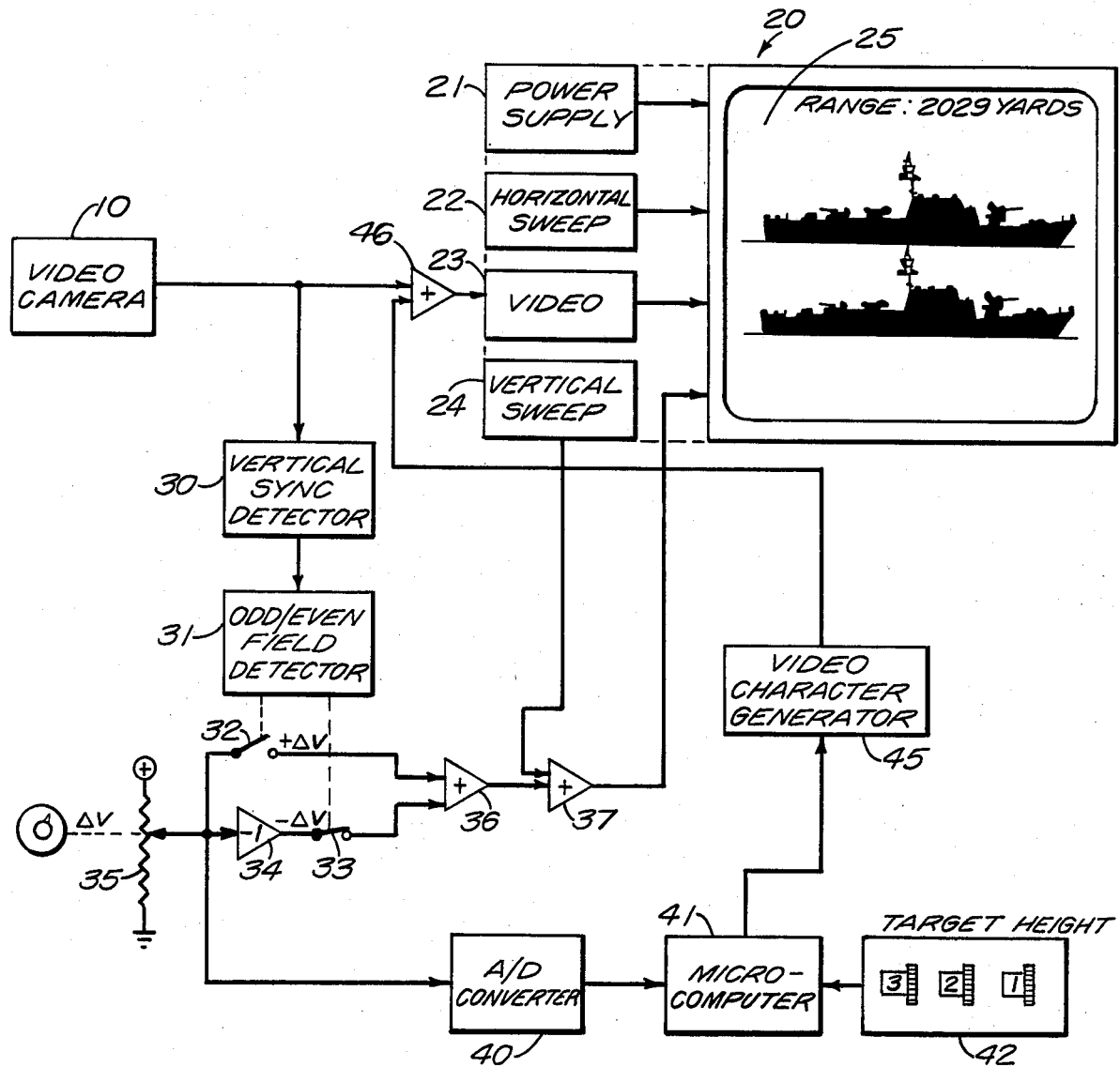
FIG. 1 is a schematic block diagram illustrating one embodiment of an invention using a conventional television camera and monitor.

In accordance with one preferred embodiment of the invention a conventional video system is modified to displace the odd and even interlaced fields of a standard raster scan in order to provide a split image. A video camera 10, which can operate in either the visible light spectrum or the infrared spectrum, creates a standard video signal supplied to a monitor 20. The monitor includes a power supply 21, horizontal sweep circuit 22, video control circuit 23 and vertical sweep circuit 24. If the vertical sweep were directly connected to the cathode ray tube in a conventional arrangement the monitor would provide a normal video picture of the camera view.

In the conventional television picture the picture is created in a 525 line raster scan consisting of two interlaced fields referred to as the odd and even fields. The electron beam first forms one of the fields including 262.5 lines going from top to bottom on the screen and then forms the other field likewise consisting of 262.5 lines also going from top to bottom. The lines of the two fields are interlaced, that is, the lines of one field lie between lines of the other field. According to the embodiment in FIG. 1, the odd and even fields are offset relative to one another to provide a split image such as that shown on screen 25.

Figure 2A:
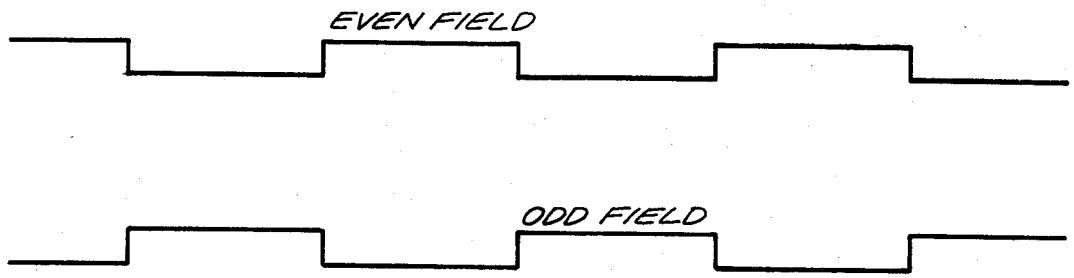
FIGS. 2A-2C are diagrams illustrating wave forms appearing in the system according to FIG. 1.

The video signal from camera 10 is supplied to a vertical sync detector circuit 30 which in turn is connected to an odd/even field detector circuit 31. The vertical sync circuit separates the vertical synchronizing signal out of the composite video signal developed by the camera. The odd/even field detector develops a signal therefrom such as that shown in FIG. 2A indicating the respective periods during which the odd and even fields are being formed.

A potentiometer 35 is connected between a positive source and ground to provide an offset potential ΔV. The signal developed by potentiometer 35 can be coupled to one input of a summing amplifier 36 via a FET (field effect transistor) switch 32. The potentiometer can also be coupled to the other input of amplifier 36 via an inverter 34 and a FET switch 33. Switch 32 is closed during formation of the even field and thus the signal $+\Delta V$ appears at the output of amplifier 36. During formation of the odd field switch 33 is closed and the signal $-\Delta V$ formed by inverter 34 appears at the output of amplifier 36.

Figure 2B:
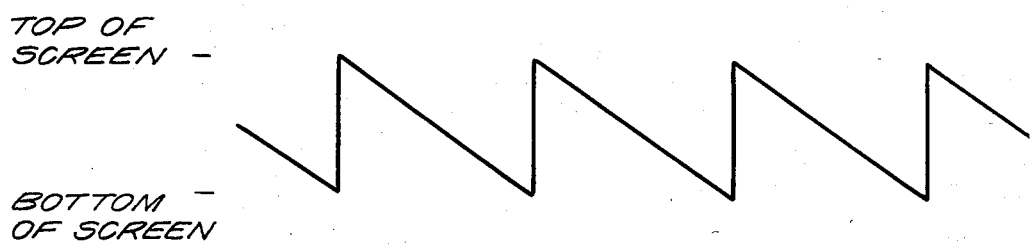
Figure 2C:
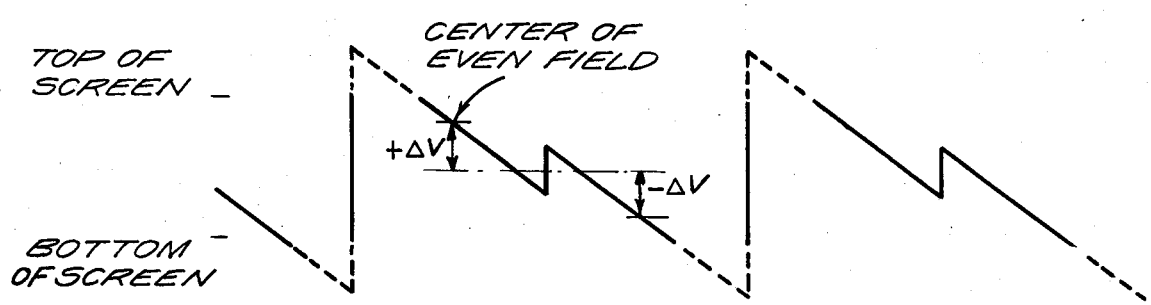

The normal vertical sweep signal of monitor 20 is as shown in FIG. 2B. This signal from vertical sweep circuit 24 is supplied to one input of a summing amplifier 37 where it is combined with the offset signal emerging from amplifier 36. The result is a combined sweep signal as shown in FIG. 2C. During formation of the even field the addition of offset potential $+\Delta V$ moves the image upwardly on the screen whereas during the formation of the odd field the addition of the offset voltage $-\Delta V$ moves the image downwardly. The result is a split image such as shown on screen 25 in FIG. 1, the amount of separation being dependent on the value of $\Delta V$ (actual separation is equal to twice $\Delta V$) as determined by the setting of potentiometer 35.

The output of potentiometer 35 is also supplied to an A/D (analog to digital) converter 40 which in turn provides a corresponding digital signal to a microcomputer 41. The computer also receives a digital signal indicating target height from a three decade thumbwheel switch 42. The microcomputer is preferably a single chip computer including both RAM (random access memory) and ROM (read only memory) such as an 8748 single chip computer. The computer is programmed to calculate range from the two supplied digital signals, i.e., the signal from unit 42 indicating actual target height and the signal from converter 40 indicating height of the visual image. Range is calculated according to the formula:

$$\text{Range} = \frac{\text{target height}}{\text{Tan } \theta \text{ (split image)}}$$

The angle $\theta$ is a function of the camera optics. A typical lens system for this application might have a focal length of 175. mm and a vertical field of view of 3.2 degrees. For $2 \times \Delta V$ at full scale (for example $2 \times V = 1$ volt), the angle $\theta$ for calculated range would be 3.2 degrees. For split images less than full scale, the angle $\theta$ is reduced proportionately. For example, with a split image as shown on screen 25 which is about 25% of full scale separation, the angle $\theta$ would be 0.8 degrees. Under these conditions, if the true height of the ship is 85 feet, the range would be 2029 yards.

The output of computer 41 is supplied to a video character generator 45 which provides character generating signal to the video circuit 23 of the monitor via a summing amplifier 46. The summing amplifier combines the video character generator signal with the video signal from camera 10. The range calculated by the computer is displayed on screen 25 in the upper right hand corner as shown in FIG. 1.

In operation the operator adjusts potentiometer 35 so that the top of the mast of the lower ship image coincides with the water line of the upper image. In other words, potentiometer 35 is adjusted in accordance with the height of the image as viewed on the screen. From a visual identification of the ship being viewed the operator can look up and determine the actual height of the ship from a suitable reference source such as Jane's Book of Ships. The value indicating the actual height is inserted via thumbwheel unit 42. The computer then calculates the range to the target and provides a suitable indication thereof such as indicated in the upper right hand corner of screen 25. In more elaborate systems the computer could be programmed to store and display information for ship identification and also include the ship height data.

The FIG. 1 embodiment is particularly easy to implement since very little modification of a standard television display is required. This technique does suffer, however, from somewhat reduced resolution and from some observable flicker in the images. These problems can be largely cured by rotating both the camera and the monitor by 90 degrees so that the normal horizontal sweep is from top to bottom rather than side to side. Monitor 60 includes the conventional power supply 61, vertical sweep signal 62, video circuit 63 and horizontal sweep circuit 64. Since both the camera and the monitor are rotated 90 degrees the image will retain its normal orientation, the only difference being that upon close examination of the image the principal scan lines are seen to be vertical rather than horizontal.

The video signal from camera 50 is supplied to a sync detector circuit 70 to extract the synchronizing signals therefrom. The output from detector 70 is connected to an alternate line detector 71 which changes its output state at the beginning of each successive line of the video image. If the video image is formed with normal interlacing of the scan lines, then one set of lines would be formed during the odd field and the alternate lines would be formed during the even field. Hence, with interlaced lines detector 71 could be an odd/even field detector such as previously described in FIG. 1.

Figure 3:
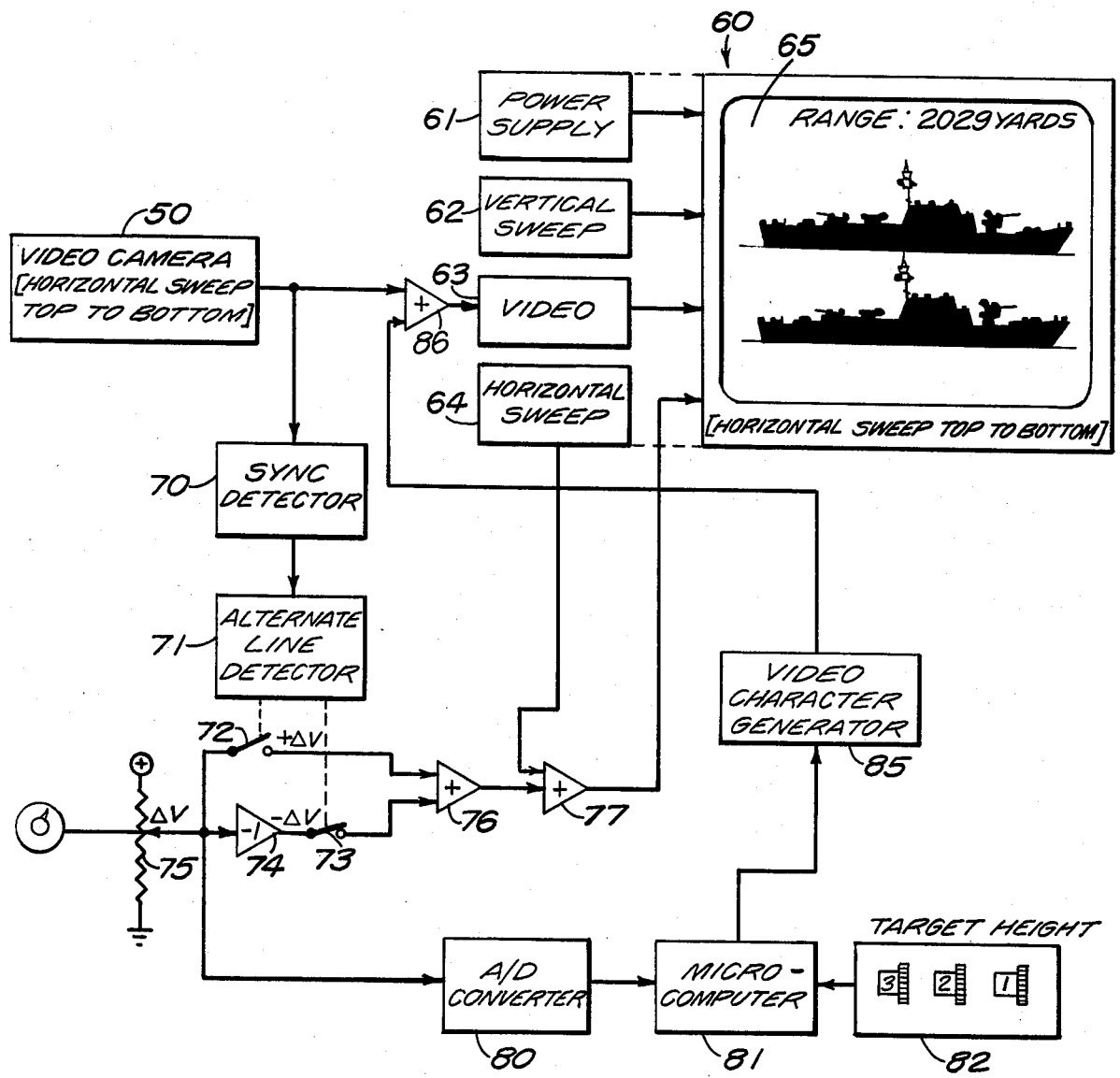
FIG. 3 is a schematic block diagram according to another embodiment of the invention in which the camera and monitor are rotated 90 degrees.

A potentiometer 75 is connected between the positive source and ground to provide an offset signal $\Delta V$. In FIG. 3 the offset signal is used to modify the horizontal sweep, however, rather than the vertical sweep as was the case in FIG. 1. The offset signal from potentiometer 75 can be supplied to one input of a summing amplifier 76 via a FET switch 72, and can be supplied to the other input of summing amplifier 76 via an inverter 74 and a FET switch 73. During formation of one scan line switch 72 is closed to provide a positive offset of $+\Delta V$ at the output of amplifier 76. During formation of the next scan line a negative offset of $-\Delta V$ appears at the output of amplifier 76. A summing amplifier 76 sums the horizontal sweep signal from circuit 64 with the offset signals from amplifier 76 to provide the actual sweep signal for monitor 60. The effect of the offset signals in this instance is to create the image either earlier or later in the scan line according to the polarity of the offset signal. Since, in this case, the scan lines are from top to bottom on the screen the result is a split image such as is shown on screen 65.

The output of potentiometer 75 is supplied to a microcomputer 81 via an A/D converter 80. The computer also receives a target height indication from a three decade thumbwheel unit 82. The computer is programmed to calculate range in the same fashion previously described for computer 41 in FIG. 1. The output of computer 81 is supplied to a video character generator 85 which supplies a character generating output to video circuit 63 of the monitor via a summing amplifier 86.

In operation, the operator adjusts potentiometer 75 until the water line of the upper image coincides with the top of the mast of the lower image. The true height of the ship being viewed is entered in unit 82 and the computer then calculates the range which is displayed in the upper right corner of screen 65.

Figure 4:
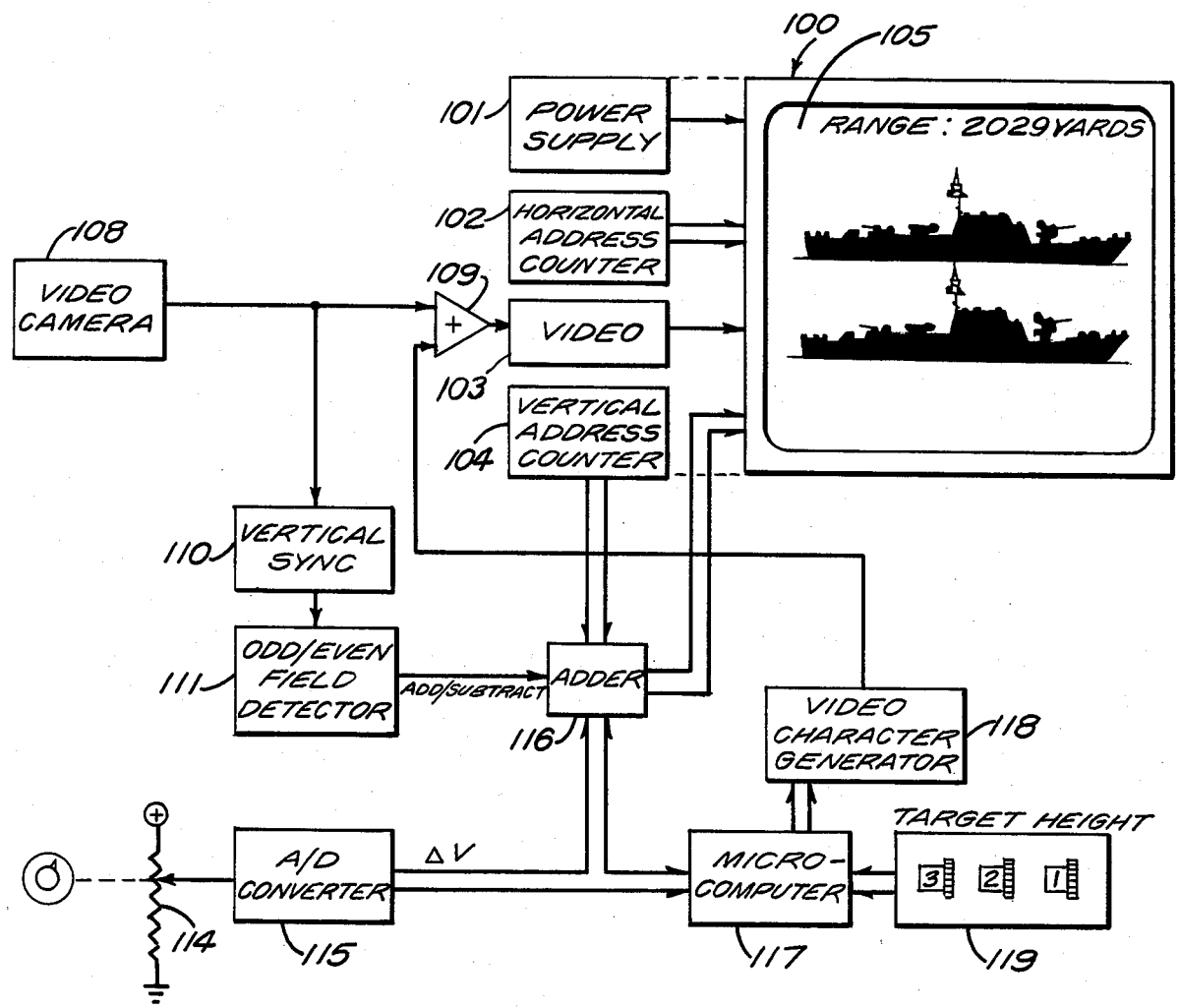
FIG. 4 is a schematic block diagram according to another embodiment of the invention utilizing a digital monitor.

Improved range accuracy can also be achieved by using a digital monitor as shown in FIG. 4. Monitor 100, in this case, includes a power supply 101 and a video control circuit 103. The location of the pixel being illuminated on screen 105 is controlled by a digital horizontal address counter 102 and by a digital vertical address counter 104.

Video camera 108 supplies the video signal to video circuit 103 via a summing amplifier 109 and also supplies the video signal to a vertical sync circuit 110. The vertical sync circuit is, in turn, connected to an odd/even field detector circuit 111. Field detector circuit 111 provides an output indication to an adder circuit 116 in accordance with the odd or even field. If the even field is being formed by the monitor then adder 116 receives "add" signal whereas if the odd field is being formed, the adder circuit receives "subtract" signal.

A potentiometer 114 is connected between the positive source and ground to provide a variable potential to control the split image formation on the screen. The potential from potentiometer 114 is designated $\Delta V$ and is supplied to an A/D converter 115 which provides a digital indication of $\Delta V$ in a parallel digital format. The value of $\Delta V$ from converter 115 is supplied to adder circuit 116 where it is either added to, or subtracted from, the vertical address as provided by vertical address counter 104. The output of adder circuit 116 controls the vertical position on the monitor which is either increased or decreased by an amount $\Delta V$ as controlled by field detector 111.

The value $\Delta V$ from converter 115 is also supplied to a microcomputer 117. The microcomputer receives a digital indication of the true target height from a three decade thumbwheel unit 119. Microcomputer 117 computes the range from the information supplied to it and controls a video character generator 118 accordingly. The output of the video character generator is incorporated into the video signal via summing amplifier 109 to provide a digital range display in the upper right hand corner of screen 105 as shown in FIG. 4.

The system according to this embodiment operates similarly to those previously described. The operator adjusts potentiometer 114 to obtain a split image such that the water line of the upper image coincides with the top of the mast of the lower image and thereby represents a visual height of the image. After identifying the ship the operator inputs, via unit 119, the true height of the target. From this information the computer calculates the range which is then added to the display in the upper right hand corner of the screen.

Figure 5:
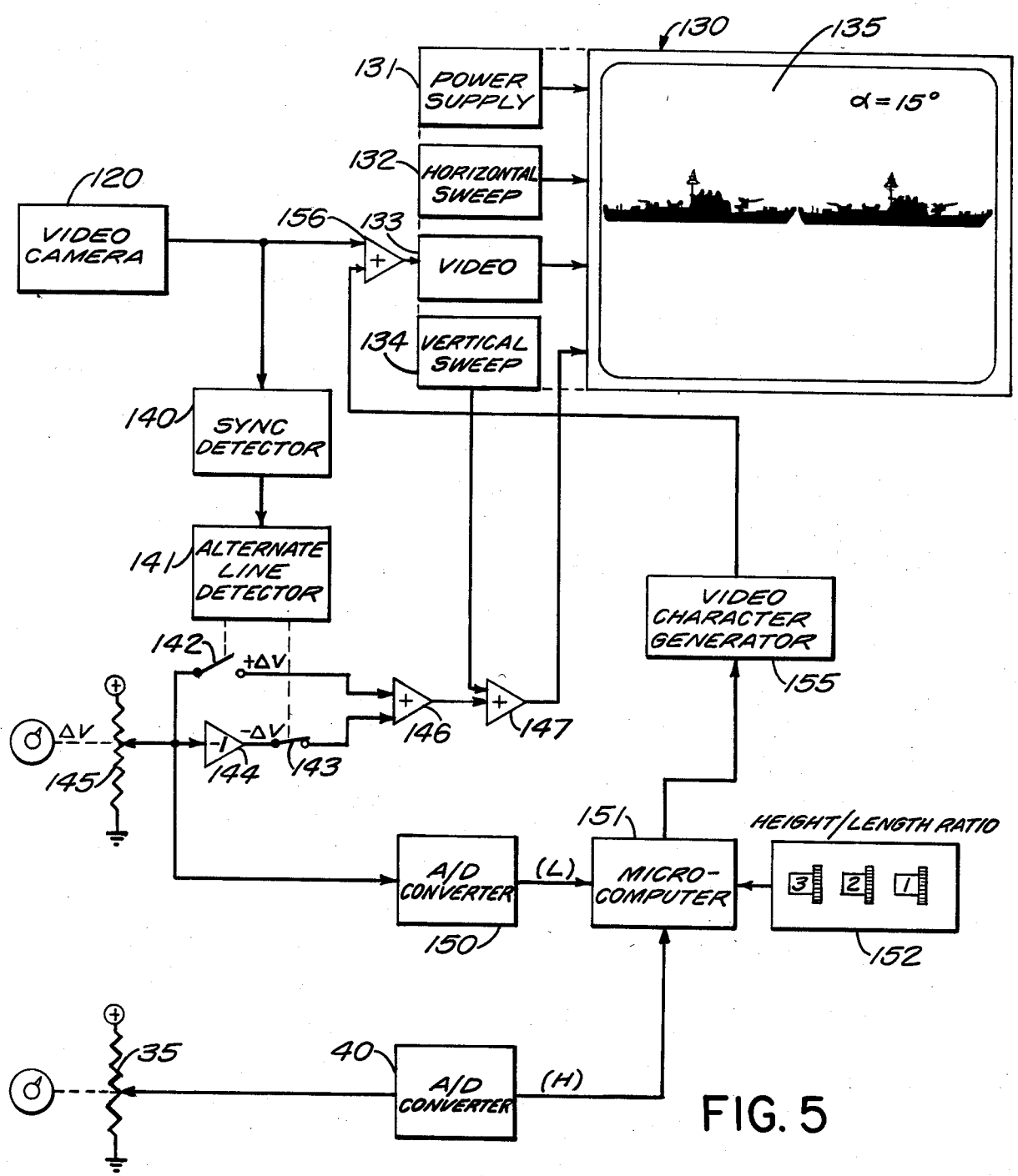
FIG. 5 is a schematic block diagram according to another preferred embodiment of the invention for measuring target orientation.

The foregoing embodiments employ the technique of the invention for determining the target range. The technique can also be employed to determine other features such as orientation of the target ship relative to the viewer. For example, as illustrated in FIG. 5, the split image technique can be utilized to determine the observed length of the ship from which a calculation can be made indicating the orientation, knowing the observed height or known range.

In this case the video signal from a camera 120 goes to a sync circuit 140 which extracts the synchronizing signals therefrom in a manner similar to that described in connection with FIG. 3. The output of detector 140 is supplied to an alternate line detector circuit 141 which changes its output state at the beginning of each successive line of the video image.

A potentiometer 145 is connected between a positive source and ground to provide an offset signal delta V which in this case is adjusted to provide an indication of the observed length of the target ship. The offset signal is used to modify the horizontal sweep signal. The offset signal can be supplied to one input of a summing amplifier 146 through an FET switch 142 or can be supplied to the other input of summing amplifier 146 via an inverter 144 and FET switch 143. During formation of one scan line switch 42 is closed to provide a positive offset at the output of amplifier 146. During formation of the alternate scan line FET switch 143 is closed and a negative offset appears at the output of amplifier 146. A summing amplifier 147 sums the horizontal signal and the output signal from amplifier 146 to provide the actual sweep signal to monitor 130. The effect on the video signal is to create an image either earlier or later in the horizontal scan line according to the polarity of the offset signal. This results in split images of the type shown on screen 135. i.e., one image created by one set of scan lines is moved to the right whereas the other image formed by the alternate scan lines is moved to the left.

When the system is operated, potentiometer 145 is adjusted until the bow of one ship image just touches the stern of the other ship image. The signal produced by potentiometer 145 is therefore a function of the observed ship length.

The output of potentiometer 145 is supplied to a microcomputer 151 via an analog to digital (A/D) converter 150 to supply a digital signal (L) corresponding to the observed ship length. The microcomputer also receives the signal from a potentiometer 35 (FIG. 1) via an A/D converter 40 which supplies the digital signal (H) corresponding to the observed ship height. Potentiometers 35 and 145 can be associated with separate monitors which display their respective split images for determining observed height and observed length, or the potentiometers can be associated with the same monitor which is switched to display either vertical or horizontal split images. The thumbwheel unit 152 supplies the true height to length ratio of the ship being observed. Once the ship is identified, the true height and true length can be determined from a reference source and the ratio calculated therefrom.

Figure 6:
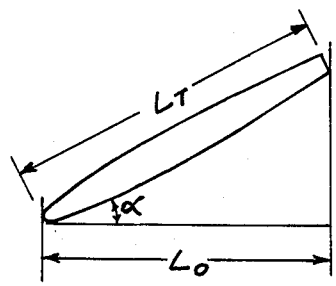
FIG. 6 is a diagram illustrating the determination of target orientation.

The relationship of the true ship length to the observed ship length is shown in FIG. 6. The true length is equal to the observed length if the ship is moving perpendicular to the line of sight and is foreshortened if the target ship is moving either toward or away from the observer. The relationship of the true length ($L_T$) to the observed length ($L_O$) is as follows:

$$L_O = L_T \cos \alpha.$$

It follows therefore that:

$$\cos \alpha = \frac{R_T}{R_O}$$

Where $R_T$ is the observed ratio (L/H) and $R_o$ is the ratio of the true target length to height. obtained from the reference source.

The output of computer 151 is supplied to a video character generator 155 which in turn provides a character display to screen 135 via amphlifer 156. As shown in FIG. 5, the ship orientation can be indicated by showing the angle which in this case is shown as 15 degrees.

Thus, the invention can be used to determine the range of the target as well as the orientation of the target.

The split image technique illustrated in FIG. 5 is preferred for determining the observed length due to the movement of the images on the screen. However, since the movement of the image is mostly in the vertical direction, a split screen display for determining length is less critical than in the case of range detection. In some installations, therefore, it may be possible to make the observed length determinations using cursors rather than split images.

Although in the foregoing description the orientation was determined utilizing the observed height/length ratio, other calculation techniques can also be employed. For example, the calculated range can be used to determine the actual observable length for direct comparison to the true length.

While only a few embodiments of the invention have been described in detail, it should be apparent to persons skilled in the art that there are numerous other variations within the scope of the invention. For example, camera and monitor equipment can be utilized operating at higher scanning rates so as to improve accuracy of the system and reduce observable flicker on the screen. A monitor with a larger number of scan lines, e.g. 1023 lines, could be employed. Although the split images described in the preferred embodiments are formed during alternate fields, such split images could also be formed utilizing different techniques such as formation during alternate frames, or formation simultaneously during the same scan through use of time delay displacements.

The invention is more particularly defined in the appended claims.

I claim:

1. A video range system comprising:
   a video monitor for displaying an image of the target being ranged:
   means for creating split images of said target on said monitor with a selected separation;
   input means for supplying a true dimension of said target; and
   computing means for calculating target range from said true dimension and said selected separation of said split images.

2. A system according to claim 1 wherein the monitor scan lines are oriented horizontally.

3. A system according to claim 1 wherein the monitor scan lines are oriented vertically.

4. A system according to claim 1 wherein said monitor forms display frames with two interlaced fields and wherein one of said split images is formed during formation of one of said fields and the other of said split images is formed during formation of the other of said fields.

5. A system according to claim 4 wherein said split images are formed by applying a positive voltage to one of said interlaced fields and a negative voltage of the same potential as said positive voltage to the other of said interlaced fields.

6. A system according to claim 5 further comprising a potentiometer for controlling the potential of said equal but opposite positive and negative voltages.

7. A system according to claim 1 wherein said video monitor is of the type wherein the illuminated screen pixel location is controlled dlgitally.

8. A system according to claim 1 wherein said monitor forms split images with alternate frames.

9. A system according to claim 1 wherein said monitor forms split images with alternate Fields of a high resolution scan rate with at least one thousand scan lines.

10. A video system for determining orientation of a target ship comprising:
    a video monitor for displaying an image of the target ship being observed;
    means for creating an electrical signal proportional to the observed length of the target ship on said video monitor;
    means for creating an electrical signal proportional to the observed height of the target ship on said video monitor;
    input means for supplying data corresponding to the true length and height dimensions of the target ship; and
    computer means for determining the orientation angle of the target ship relative to the observer from said data related to said true length and height dimensions and from said electrical signals proportional to the observed length and height of the target ship on said video monitor.

11. A system according to claim 10 further including means for creating split images of said target ship on said monitor for determining the observed length of said target ship.

12. A system according to claim 10 wherein said computing means also calculates the range of the target ship from said observed height and said data corresponding to the true height of the target.

13. A system according to claim 12 further including means for creating split images of said target for determining the observed height on said video monitor.

14. A system according to claim 13 wherein said monitor forms display frames with two interlaced fields and wherein one of said split images is formed during formation of one of said fields and the other of said split images is formed during formation of the other of said fields.

15. A system according to claim 14 wherein said split images are formed by applying a positive voltage to one of said interlaced fields and a negative voltage of the same potential as said positive voltage to the other of said interlaced fields.

16. A system according to claim 15 further comprising a potentiometer for controlling the potential of said equal but opposite positive and negative voltages.

* * * * *